United States Patent
Tsuyuki et al.

(10) Patent No.: US 11,671,200 B2
(45) Date of Patent: Jun. 6, 2023

(54) NETWORK TEST APPARATUS AND NETWORK TEST METHOD

(71) Applicant: ANRITSU CORPORATION, Kanagawa (JP)

(72) Inventors: Akinobu Tsuyuki, Kanagawa (JP); Tomohiro Ito, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 28 days.

(21) Appl. No.: 17/182,659

(22) Filed: Feb. 23, 2021

(65) Prior Publication Data
US 2021/0273745 A1 Sep. 2, 2021

(30) Foreign Application Priority Data
Feb. 28, 2020 (JP) .............................. JP2020-033640

(51) Int. Cl.
*H04L 1/00* (2006.01)
*H04L 27/06* (2006.01)

(52) U.S. Cl.
CPC ............ *H04L 1/0045* (2013.01); *H04L 27/06* (2013.01)

(58) Field of Classification Search
None
See application file for complete search history.

(56) References Cited

U.S. PATENT DOCUMENTS

| 11,005,598 B1* | 5/2021 | Jones ................ H03M 13/1575 |
| 2017/0250780 A1* | 8/2017 | Ge .......................... H04L 5/006 |
| 2020/0396021 A1* | 12/2020 | Schnizler .............. H04L 1/0045 |

FOREIGN PATENT DOCUMENTS

JP 2014-183429 A 9/2014

OTHER PUBLICATIONS

MT1000A,MU100010A, Network Master Pro, Operation Manual.*
IEEE (400GBASE-LR8 Measurement Data for Reaches >10km Jul. 2018).*
NPL (NetBlazer Series Multiservice Tester Powerful, Comprehensive and Fast Multiservice Testing, 2015).*

* cited by examiner

*Primary Examiner* — Abdelillah Elmejjarmi
(74) *Attorney, Agent, or Firm* — Pearne & Gordon LLP

(57) ABSTRACT

An object of the present disclosure is to determine whether or not a codeword in which a plurality of symbol errors are corrected occurs, and to detect a potential network failure. According to the present disclosure, there is provided a network test apparatus including: a reception unit that receives codewords generated by using pulse amplitude modulation (PAM); an arithmetic processing unit that measures the number of symbol errors per codeword included in the codewords by using forward error correction (FEC), and counts the number of codewords for each number of symbol errors per codeword; and a display unit, in which whether or not there is a codeword in which a plurality of symbol errors are corrected is displayed on the display unit by using the number of codewords.

11 Claims, 8 Drawing Sheets

| Symbol Error/Codewords | |
|---|---|
| Symbol Error Count 0 | 1.81E+08 |
| Symbol Error Count 1 | 4.63E+08 |
| Symbol Error Count 2 | 5.92E+08 |
| Symbol Error Count 3 | 5.06E+08 |
| Symbol Error Count 4 | 3.25E+08 |
| Symbol Error Count 5 | 1.67E+08 |
| Symbol Error Count 6 | 7.19E+07 |
| Symbol Error Count 7 | 2.66E+07 |
| Symbol Error Count 8 | 8.61E+06 |
| Symbol Error Count 9 | 2.49E+06 |
| Symbol Error Count 10 | 6.49E+05 |
| Symbol Error Count 11 | 1.55E+05 |
| Symbol Error Count 12 | 3.38E+04 |
| Symbol Error Count 13 | 6.71E+03 |
| Symbol Error Count 14 | 1.27E+03 |
| Symbol Error Count 15 | 2.28E+02 |
| Uncorrectable Codewords | 3.70E+01 |

| | |
|---|---|
| Distribution error threshold | 10 |
| Symbol error rate | 4.86E-03 |
| Max corr. count | 15 |
| Frame loss | 0 |

◯ Pass ◉ Warning ● Fail

FIG. 5

NETWORK TEST APPARATUS AND NETWORK TEST METHOD

TECHNICAL FIELD

The present disclosure is related to a network test apparatus and a network test method.

BACKGROUND ART

For 400 Gbit Ethernet (400 GbE) (Ethernet is a registered trademark) based on the IEEE 802.3 standard, for example, a 25 GBaud PAM4 signal×8, a 50 GBaud PAM4×4 optical signals, or an electric signal is used. Since a signal using such pulse amplitude modulation (PAM) having 3 or more has a plurality of voltage levels in one symbol, a difference in voltage from other values is small and erroneous determination is likely to occur. Further, the optical signal used in this standard has a high bit rate and low noise immunity. For this reason, in this standard, the network is operated on the premise that an error will occur, and it is essential to correct the occurring error and be operated by applying forward error correction (FEC).

The FEC is a coding technology for correcting an error that occurs on a network or in a network apparatus and restoring the network or the network apparatus to the original state. When the FEC is applied, communication data is divided into units called codewords and transmitted, and error correction is performed for each codeword at a time of reception. Meanwhile, in a case where errors equal to or greater than a certain number occur in FEC symbols included in the codeword, the codeword error cannot be corrected. In the standard described above, an error-corrected codeword is defined as "Correctable Codeword", and a codeword for which an error cannot be corrected is defined as "Uncorrectable Codeword".

The concern of an operator who operates the network is that the Uncorrectable Codeword occurs and communication data is lost. In order to guarantee that the Uncorrectable Codeword does not occur, determining whether error correction occurs frequently and the Uncorrectable Codeword is likely to occur in the network is also an important indicator.

The following documents are available as network test apparatuses.

RELATED ART DOCUMENT

[Patent Document]
[Patent Document 1] JP-A-2014-183429

DISCLOSURE OF THE INVENTION

Problem that the Invention is to Solve

An object of the present disclosure is to determine whether or not a codeword in which a plurality of symbol errors are corrected occurs.

Means for Solving the Problem

Specifically, according to the present disclosure, there is provided an apparatus including: a reception unit that receives codewords generated by using pulse amplitude modulation (PAM); an arithmetic processing unit that measures the number of symbol errors per codeword included in the codewords by using forward error correction (FEC), and counts the number of codewords for each number of symbol errors per codeword; and a display unit, in which whether or not there is a codeword in which a plurality of symbol errors are corrected is displayed on the display unit by using the number of codewords.

Specifically, according to the present disclosure, there is provided a method including: receiving codewords generated by using pulse amplitude modulation (PAM) by a reception unit (11); measuring the number of symbol errors per codeword included in the codewords by using forward error correction (FEC), and counting the number of codewords for each number of symbol errors per codeword by an arithmetic processing unit (12); and providing a display unit (14), in which error correction is performed on an FEC symbol included in the codeword by using the FEC, and whether or not there is a codeword in which a plurality of symbol errors are corrected is displayed on the display unit by using the number of codewords.

Advantage of the Invention

According to the present disclosure, it is possible to determine whether or not a codeword in which a plurality of symbol errors are corrected occurs.

BRIEF DESCRIPTION OF THE DRAWINGS

FIG. 5 illustrates a first display example of a display unit according to a second embodiment.

BEST MODE FOR CARRYING OUT THE INVENTION

Figure 1:
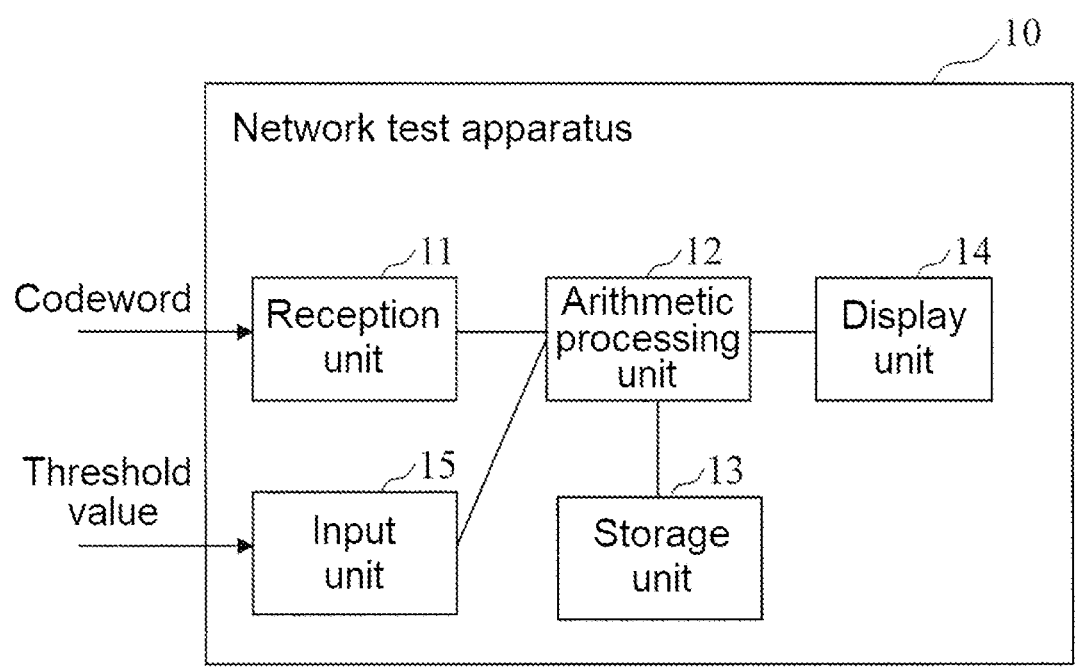
FIG. 1 illustrates an example of a configuration of a network test apparatus.

Hereinafter, embodiments according to the present disclosure will be described in detail with reference to drawings. The present disclosure is not limited to the embodiments described below. These embodiments are merely examples, and the present disclosure can be implemented in various modifications and improvements based on the knowledge of those skilled in the art. In this specification and the drawings, configuration elements having the same reference numerals indicate the same elements.

First Embodiment

FIG. 1 illustrates an example of a configuration of a network test apparatus. A network test apparatus 10 according to the present embodiment includes a reception unit 11, an arithmetic processing unit 12, a storage unit 13, a display unit 14, and an input unit 15. The reception unit 11 and the arithmetic processing unit 12 can also be realized by a computer and a program, and the program can be recorded on a recording medium or provided through a network.

The reception unit 11 receives a codeword. The codeword is a codeword defined by 400 Gbit Ethernet (400 GbE) (Ethernet is a registered trademark) based on the IEEE 802.3 standard.

Figure 2:
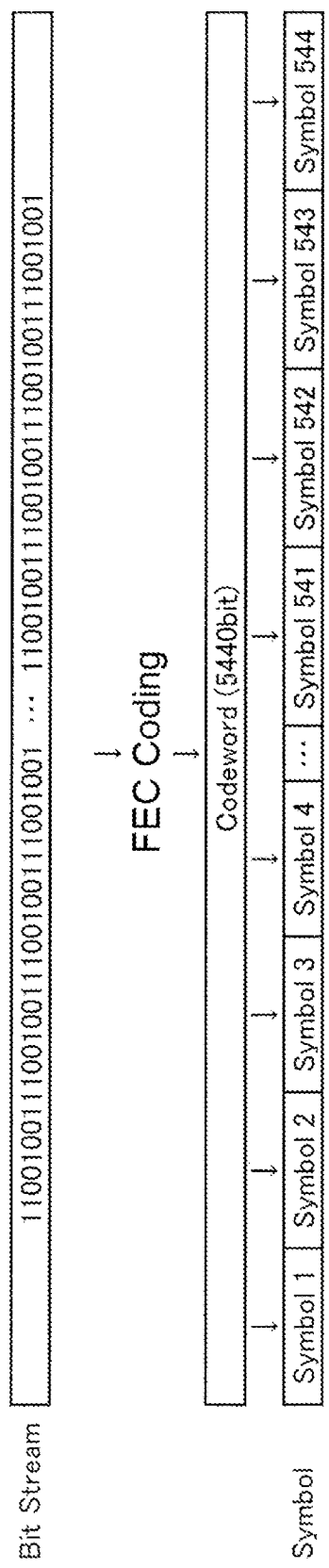
FIG. 2 illustrates an example of a codeword.

FIG. 2 illustrates an example of signal coding by FEC. FIG. 2 illustrates RS-FEC (reed solomon FEC) using RS (544, 514) as an example. In the RS-FEC, a data stream is divided into a fixed size and coded by using the FEC. This coded unit is called a codeword. The codeword is divided into units called symbols (FEC symbols), and error correction is performed in units of FEC symbols.

In the RS-FEC using RS (544, 514), error correction succeeds in a case where the number of symbol errors of the codeword is equal to or less than 15, and the error correction fails in a case where the number of symbol errors per codeword is equal to or greater than 16. Here, the number of symbol errors is the number of FEC symbols of which errors are successfully corrected, among FEC symbols included in the codeword. A codeword that succeeds in error correction is called "Correctable Codeword", and a codeword that fails in error correction is called "Uncorrectable Codeword".

The input unit 15 acquires a threshold value for a pass or fail determination of a symbol error. For example, the threshold value is a threshold value for the number of symbol errors per codeword. For example, in a case where RS (544, 514) is used for FEC, the threshold value is any value from 1 to 15. The input unit 15 can use any input means such as a keyboard, a mouse, or a touch panel. The input unit 15 may be a means for receiving a control signal for acquiring a command from the outside.

Figure 3:
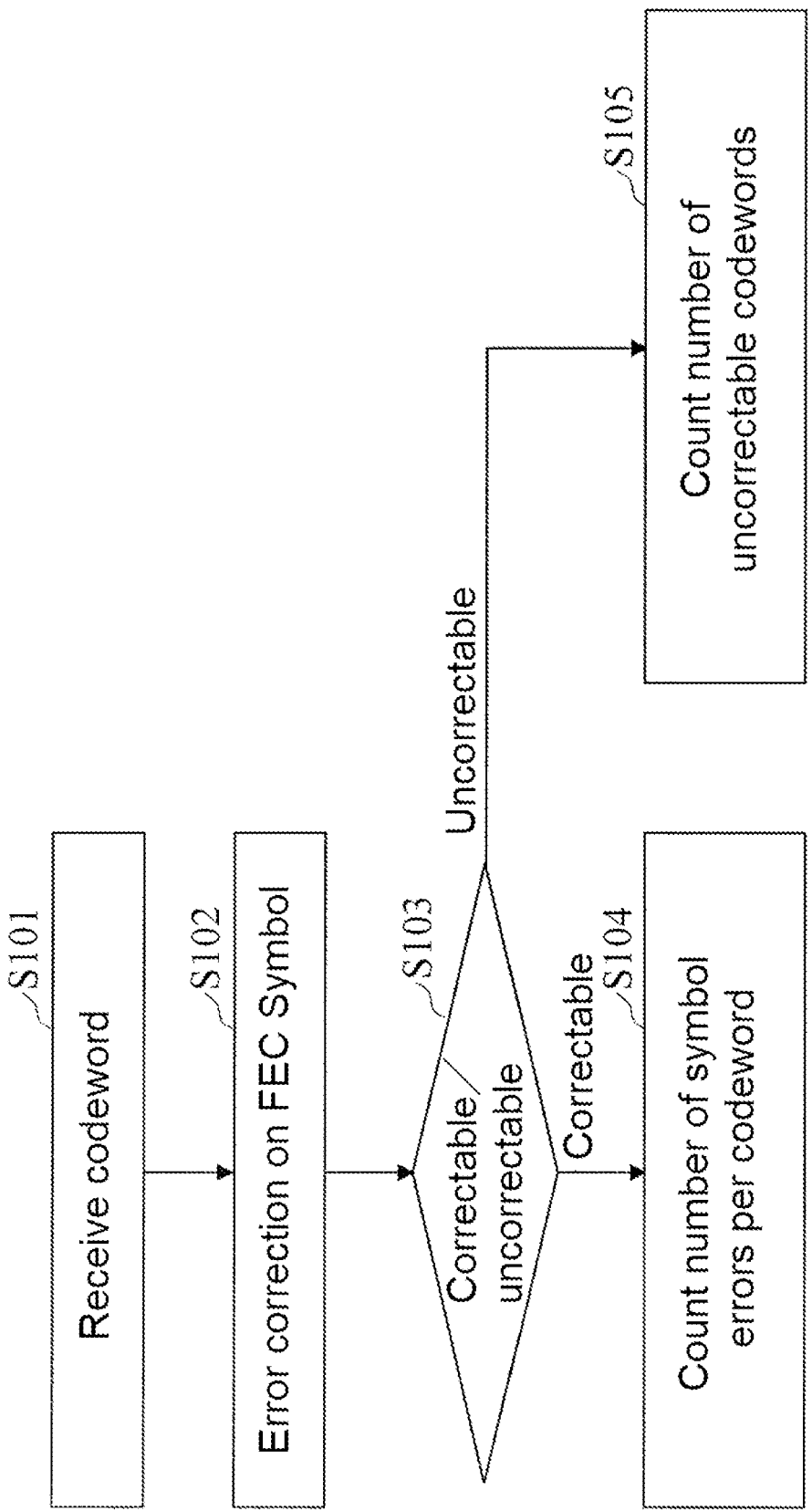
FIG. 3 illustrates an example of an operation of the network test apparatus.

FIG. 3 illustrates an example of an operation of the network test apparatus. The reception unit 11 receives a codeword (S101), and the arithmetic processing unit 12 corrects an error of each FEC symbol by using a parity included in the codeword (S102).

In a case where the codeword received by the reception unit 11 is "Uncorrectable Codeword" (Uncorrectable in S103), information on all the symbols included in the codeword including a symbol without an error is lost. Therefore, the arithmetic processing unit counts the number of codewords for which error correction cannot be performed (S105). For example, the arithmetic processing unit 12 increments the count of the number of codewords of the "Uncorrectable Codeword" stored in the storage unit 13, by 1.

In a case where the codeword received by the reception unit 11 is "Correctable Codeword" (Correctable in S103), the arithmetic processing unit 12 counts the number of corrected FEC symbols among the FEC symbols included in the codeword, and stores the number of corrected FEC symbols in the storage unit 13 (S104). That is, the arithmetic processing unit 12 counts the number of symbol errors per codeword. For example, the arithmetic processing unit 12 increments the count of the number of codewords corresponding to the number of symbol errors stored in the storage unit 13, by 1.

The arithmetic processing unit 12 further performs a pass or fail determination based on a threshold value. The pass or fail determination is, for example, classification into any one of a pass, a fail, and a warning. For example, in a case where the codeword is "Uncorrectable Codeword" (Uncorrectable in S103), the arithmetic processing unit 12 determines that the codeword fails. In a case where the number of symbol errors per codeword is lower than the threshold value, the arithmetic processing unit 12 determines that the codeword is passes. In a case where the number of symbol errors per codeword is equal to or greater than the threshold value, the arithmetic processing unit 12 determines that the result is a warning.

The arithmetic processing unit 12 stores a time of a timing at which the warning is generated in the storage unit 13. As a result, a user can confirm the time at which the problem occurs.

Figure 4:
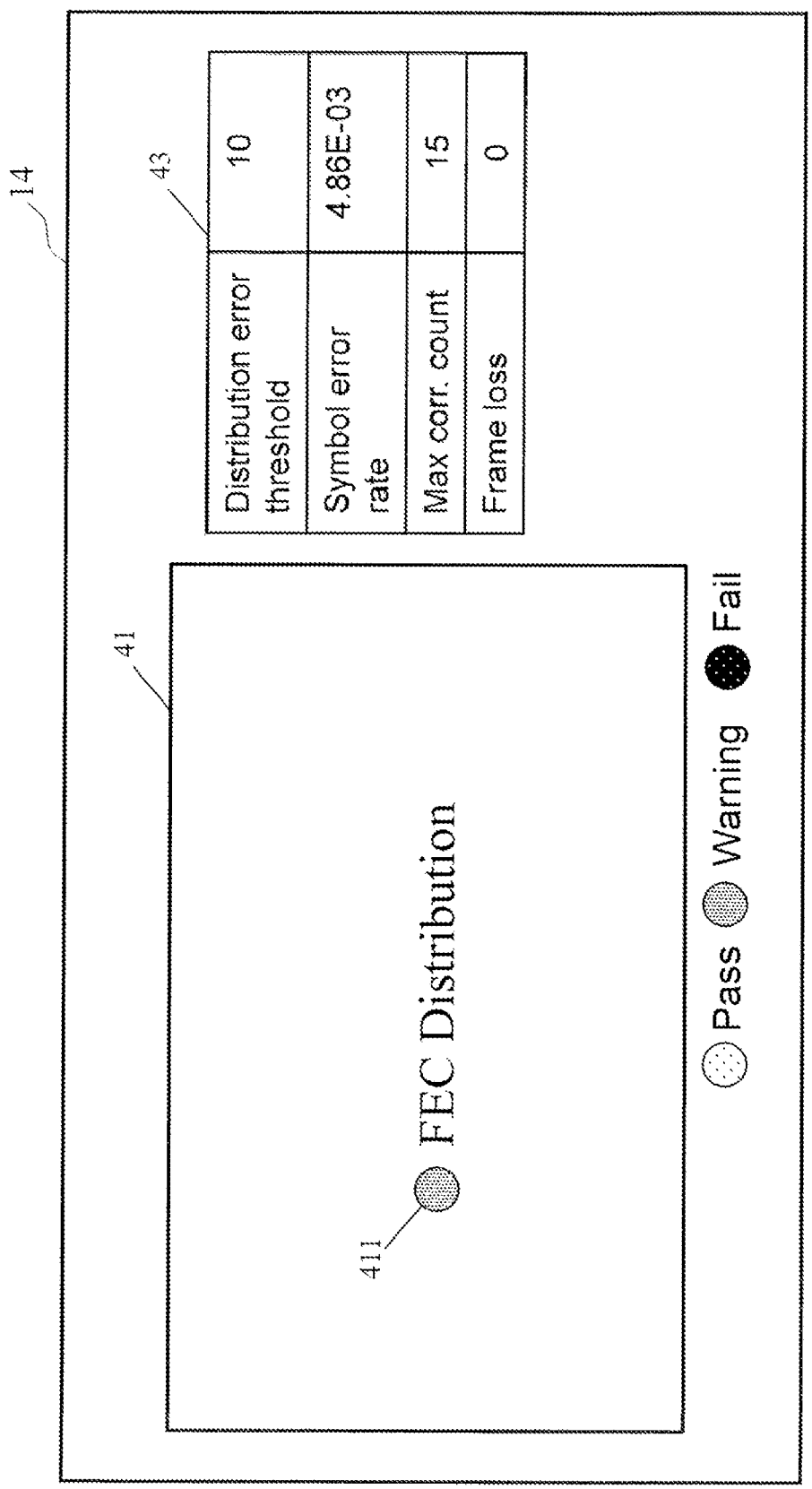
FIG. 4 illustrates a display example of a display unit according to a first embodiment.

FIG. 4 illustrates a display example of the display unit 14. The display unit 14 displays whether or not there is a codeword in which a plurality of symbol errors are corrected, on a window 41. For example, in a case where a threshold value input by the input unit 15 is "10" and the number of symbol errors per codeword is 14, the display unit 14 displays a mark 411 which is a warning, on the window 41. As described above, the present disclosure can output the warning for the poor quality network by setting the threshold value for the number of symbol errors.

The display unit 14 may display a field 43 for displaying at least one of the threshold value of "10" input by the input unit 15, a symbol error rate of "$4.86 \times 10^{-3}$", a maximum value of the number of symbol errors per codeword, and the number of lost frames "0".

Some network test apparatuses have a function of displaying distribution of FEC errors. Meanwhile, it is difficult to detect a problem at a time of measurement since there is no warning in a case where there is a high risk that Uncorrectable Codeword occurs or knowledge is required for determination. On the other hand, the present disclosure can set a threshold value for the number of symbol errors and output a warning to the network having a high risk of error correction being impossible. As such, the present disclosure can discover potential network failures and take action before problems occur.

Second Embodiment

In the present embodiment, the number of codewords is displayed for each number of symbol errors per codeword.

FIG. 5 illustrates a first display example of the display unit 14 according to the present embodiment. The display unit 14 displays a list having the number of codewords for each symbol error number in the window 41. Here, in a case where a threshold value of "10" is input to the input unit 15, the mark 411 indicating a pass, a fail, or a warning is displayed in each symbol error number. The mark 411 is displayed, for example, in green in a case of the pass, in red in a case of the fail, and in yellow in a case of the warning.

In the window 41, at least one of the number of symbol errors or the number of counters per codeword may be highlighted instead of the mark 411 or with the mark 411 illustrated in FIG. 5. The highlighting includes, for example, any form of highlighting a numerical value or a surround of the numerical value with a color such as yellow.

Figure 6:
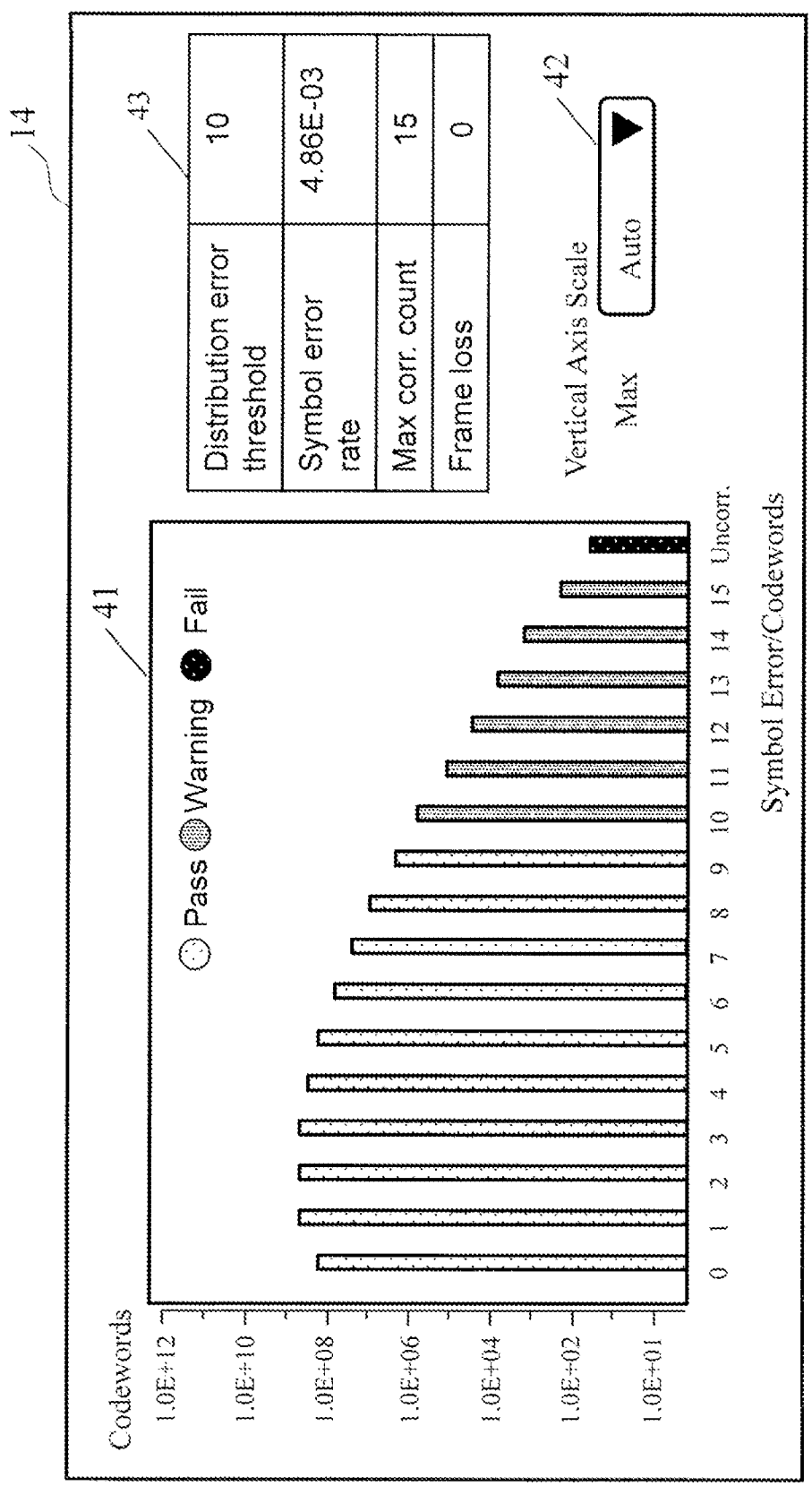
FIG. 6 illustrates a second display example of the display unit according to the second embodiment.

FIG. 6 illustrates a second display example of the display unit 14 according to the present embodiment. The display unit 14 displays a graph of the number of codewords for each symbol error number in the window 41. For example, in the window 41, a bar graph in which a horizontal axis indicates the number of symbol errors per codeword and a vertical axis indicates the number of codewords is displayed. In this manner, the present disclosure displays a graph of distribution of the number of symbol errors per codeword.

Further, the display unit 14 displays a graph of the number of "Uncorrectable Codeword"s counted in step S105, in the window 41.

A color of the graph display in the window 41 differs depending on a result of a pass or fail determination according to a threshold value. For example, in a case of the pass, the graph is displayed in green, in a case of the fail, the graph is displayed in red, and in a case of the warning, the graph is displayed in yellow. For example, the display unit 14 displays the graph in green in a case where the number of symbol errors is 0 to 9, displays the graph in yellow in a case where the number of symbol errors is 10 to 15, and displays the graph in red in a case where the number of symbol errors is equal to or greater than 16 and the codeword error cannot be corrected.

When displayed in units of 1 second, a lower limit may disappear outside the graph. Therefore, it is possible to adopt a setting in which the counter is fixed until a reset is performed so that it can be seen that the counter occurs even once. On the other hand, when the counter is fixed, in the example in FIG. 6, as a time elapses, a difference between the number of codewords having symbol error numbers of "0" and the number of codewords having symbol error numbers of 6 to 15 illustrated in FIG. 6 widens. Therefore, a scale on a vertical axis is displayed logarithmically so as to be visually recognized even in a case where the number of codewords is 1. Further, the display unit 14 includes a window 42 for setting the scale of the vertical axis. The window 42 can be freely set by a user, and an "Auto" for automatically displaying the entire window 42 can also be set.

According to the present disclosure, since a threshold value is set for the number of symbol errors and the number of symbol errors is displayed graphically, the user can intuitively determine error distribution.

Third Embodiment

In the present embodiment, the number of codewords counted at different times is displayed simultaneously in the window 41.

Figure 7:
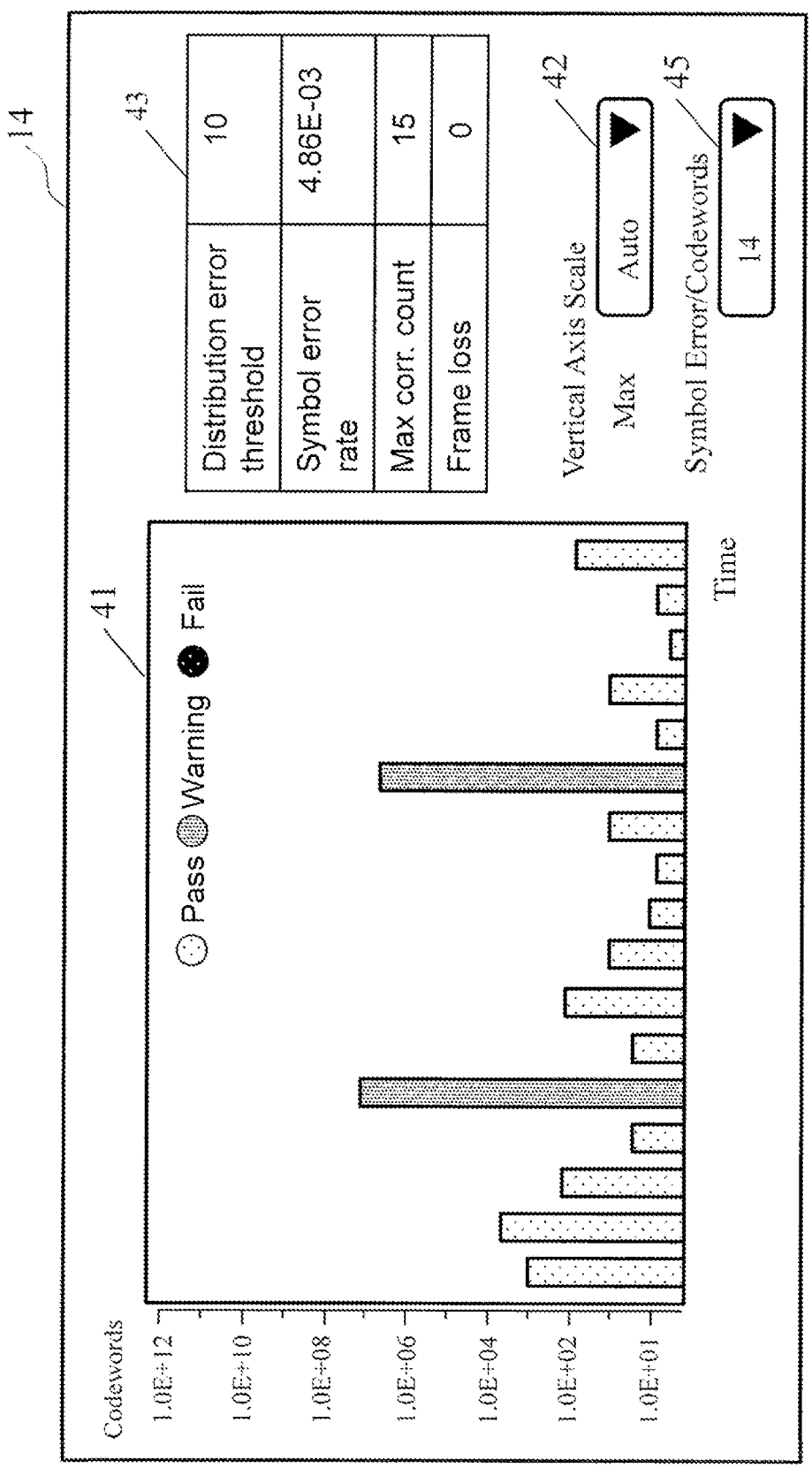
FIG. 7 illustrates a display example of a display unit according to a third embodiment.

FIG. 7 illustrates a display example of the display unit 14 according to the present embodiment. In FIG. 7, as an example, a bar graph in which a horizontal axis indicates each time and a vertical axis indicates the number of codewords is illustrated. FIG. 7 illustrates, as an example, a case where the number of symbol errors of "14" per codeword is selected by a selection unit 45. The present embodiment can be applied to any combination of one or more in which the number of symbol errors per codeword is 0 to 16.

According to the present embodiment, since the results before and after the setting change are displayed on the same screen, it is possible to compare a time change of the symbol error. Further, by displaying the graph in real time, it is possible to intuitively compare the effects of changing the calibration settings.

The present embodiment can be applied to the first embodiment. For example, the display unit 14 may perform a three-dimensional display in which the number of symbol errors per codeword is displayed on an x-axis, each time on is displayed a y-axis, and the number of codewords is displayed on a z-axis.

Fourth Embodiment

Figure 8:
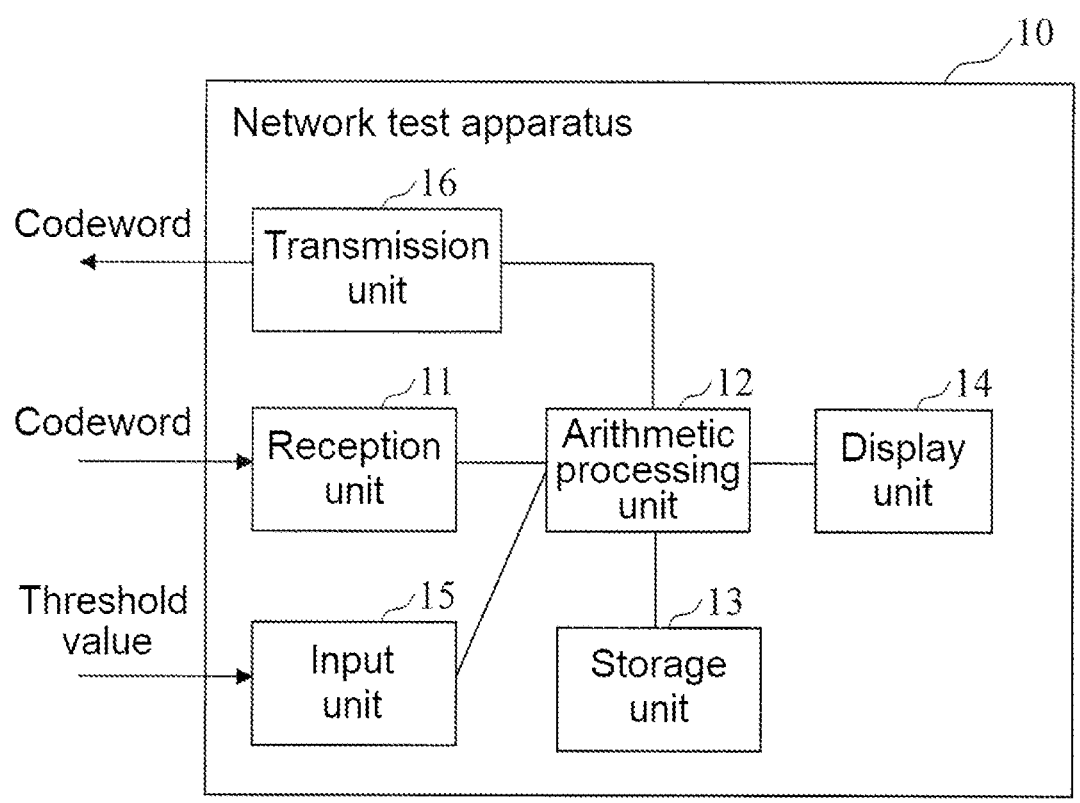
FIG. 8 illustrates another example of the configuration of the network test apparatus.

FIG. 8 illustrates an example of another form of the network test apparatus according to the present disclosure. The network test apparatus 10 according to the present disclosure may further include a transmission unit 16 that transmits a codeword.

The arithmetic processing unit 12 generates a codeword of 400 Gbit Ethernet (400 GbE) (Ethernet is a registered trademark) based on the IEEE 802.3 standard. The transmission unit 16 outputs the codeword generated by the arithmetic processing unit 12 to a network which is a device under test (DUT). Here, the arithmetic processing unit 12 can generate an FEC symbol having a state in which any error occurs, and cause the transmission unit 16 to transmit the FEC symbol.

The reception unit 11 receives the codeword from the network which is a device under test (DUT). As described in the first embodiment and the second embodiment, the display unit 14 displays the presence or absence of a codeword in which a plurality of symbol errors are corrected. As a result, the user can confirm an operation of the network which is a device under test (DUT) based on the symbol error displayed on the display unit 14.

Industrial Applicability

The present disclosure can be applied to information communication industry.

Description of Reference Numerals and Signs

10: Network test apparatus
11: Reception unit
12: Arithmetic processing unit
13: Storage unit
14: Display unit
15: Input unit
16: Transmission unit

What is claimed is:
1. A network test apparatus comprising:
  a receiver that receives codewords generated by using pulse amplitude modulation (PAM);
  a processor that:
    measures the number of symbol errors per codeword included in the codewords by using forward error correction (FEC), and
    counts the number of codewords for each number of symbol errors per codeword; and
  a display screen that displays:
    whether or not there is a codeword in which a plurality of symbol errors are corrected by using the number of codewords, and
    a table of a plurality of codewords,
  wherein each codeword in the table is labeled with a warning sign or a pass sign,
  wherein a first codeword of the plurality of codewords with a first number of symbol errors being equal to or greater than a threshold is labeled with the warning sign, and
  wherein a second codeword of the plurality of codewords with a second number of symbol errors being lower than the threshold is labeled with the pass sign.

2. The network test apparatus according to claim 1, wherein the display screen displays the number of codewords as a graph for each number of symbol errors per codeword.

3. The network test apparatus according to claim 2, further comprising:
  an input user interface that acquires the threshold, the threshold indicating the number of symbol errors per codeword.

4. The network test apparatus according to claim 3, wherein the display screen displays the number of codewords in different colors depending on whether the number of symbol errors is equal to or greater than the threshold or is less than the threshold.

5. The network test apparatus according to claim 4, wherein the codeword is a codeword defined by 400 Gbit Ethernet (400 GbE) (Ethernet is a registered trademark) based on an IEEE 802.3 standard.

6. The network test apparatus according to claim 1, further comprising:
a transmitter that transmits the codeword generated by using the pulse amplitude modulation (PAM).

7. A network test method comprising:
receiving codewords generated by using pulse amplitude modulation (PAM) by a receiver;
measuring the number of symbol errors per codeword included in the codewords by using forward error correction (FEC) by a processor,
counting the number of codewords for each number of symbol errors per codeword by the processor; and
providing a display screen that displays:
whether or not there is a codeword in which a plurality of symbol errors are corrected by using the number of codewords, and
a table of a plurality of codewords, wherein each codeword in the table is labeled with a warning sign or a pass sign,
wherein a first codeword of the plurality of codewords with a first number of symbol errors being equal to or greater than a first threshold is labeled with the warning sign, and a second codeword of the plurality of codewords with a second number of symbol errors being lower than the threshold is labeled with the pass sign.

8. The network test method according to claim 7, wherein the display screen displays the number of codewords as a graph for each number of symbol errors per codeword.

9. The network test method according to claim 8, further comprising:
receiving the threshold as an input, the threshold indicating the number of symbol errors per codeword.

10. The network test method according to claim 9, wherein the display screen displays the number of codewords in different colors depending on whether the number of codewords is equal to or greater than the threshold value or is less than the threshold value.

11. The network test method according to claim 10, wherein the codeword is a codeword defined by 400 Gbit Ethernet (400 GbE) (Ethernet is a registered trademark) based on an IEEE 802.3 standard.

\* \* \* \* \*